United States Patent [19]
Gross et al.

[11] Patent Number: 5,191,466
[45] Date of Patent: Mar. 2, 1993

[54] HIGH RESOLUTION TWO-DIRECTIONAL OPTICAL SCANNER

[75] Inventors: Abraham Gross, Rehovot; Eviatar Halevi, Maccabim; Ran Carmeli, Petach-Tikva, all of Israel

[73] Assignee: Optrotech Ltd., Nes Ziona, Israel

[21] Appl. No.: 749,868

[22] Filed: Aug. 26, 1991

[51] Int. Cl.$^5$ .............................................. G02F 1/33
[52] U.S. Cl. .................. 359/305; 359/310; 358/201
[58] Field of Search ............... 359/305, 310, 312, 314; 358/201, 486

[56] References Cited

U.S. PATENT DOCUMENTS

| | | | |
|---|---|---|---|
| 3,851,951 | 12/1974 | Eveleth | 358/201 |
| 4,541,712 | 9/1985 | Whitney | 359/310 |
| 4,776,654 | 10/1988 | Ishizuka et al. | 359/310 |
| 5,067,798 | 11/1991 | Tomoyasu | 359/305 |

Primary Examiner—Bruce Y. Arnold
Assistant Examiner—Evelyn A. Lester
Attorney, Agent, or Firm—Helfgott & Karas

[57] ABSTRACT

A high resolution two-directional optical scanner, comprising a source of very high frequency light pulses, a first acousto-optic cell for diffracting the light pulses towards an image plane so as to form on a predetermined area thereof a line of pixels corresponding to the data, and a second acousto-optic cell intermediate the first acousto-optic cell and the image plane for intercepting the light pulses diffracted by the first acousto-optic cell and diffracting them towards the image plane in a second direction perpendicular to the line of pixels at an angle dependent on a scanning signal fed to the second acousto-optic cell. The invention is particularly suited for use with flat bed plotters and reduces the need to transport the plotter bed mechanically in order to achieve scanning normal to the direction of each complete scan line.

12 Claims, 4 Drawing Sheets

HIGH RESOLUTION TWO-DIRECTIONAL OPTICAL SCANNER

FIELD OF THE INVENTION

This invention relates to an optical scanner employing an acousto-optic cell for diffracting a laser beam modulated in accordance with an acoustic wave fed to the acousto-optic cell.

BACKGROUND OF THE INVENTION

When using laser plotters for high resolution pattern drawing, a problem arises when attempting to write on large areas high resolution pixels having a small size. In the electronics industry, the density of features in a given plot increases whilst there is no compensating decrease in the required image area. In the field of graphic arts, printing plates must accommodate ever increasing numbers of pages per single plate. In both cases, the requirements are even more severe when the written medium is flat, such as a glass photo-mask, a printed circuit board or a printing plate.

Optical scanners provide a well known solution for the above problems. One approach embraces a source of pulsed laser light for illuminating an acousto-optic Bragg cell functioning as a modulator. An electrical signal corresponding to optical data is fed to the acousto-optic Bragg cell for producing therein a varying diffraction grating for diffracting the laser light in accordance with the modulated electrical signal.

For example, in "Recent Components and Techniques in Optical Strobe Recording"(SPIE Proc. Vol 299, August 1981, pp. 98 to 103), R. A. Coppock and R. F. Croce disclose a wideband analog photorecorder comprising a transparent Bragg cell as an acousto-optical transducer and a pulsed laser positioned to sequentially illuminate a moving recording medium such as a photographic film through the cell. The acousto-optic cell is energized by an input electrical signal and the resulting sound wave passing through the cell diffracts the strobe light output beam from the laser so as to expose the film one line at a time with the optical analog of the signal.

Similarly, U.S. Pat. No. 3,851,951 (Eveleth) discloses a laser beam recording and playback system in which light is focused upon an image plane by interaction with frequency modulated acoustic pulses in a Bragg cell and is scanned across the image plane in accordance with the movement of the pulses along the cell.

In both of these prior art references, the Bragg cell functioning as an acousto-optic modulator produces optical scanning in one direction only of the image plane.

Typically, scanning in the direction perpendicular to the scan lines is achieved using a rotary polygon mirror. However, when high resolution imaging is required, polygon mirrors are generally unsatisfactory owing to their inherent manufacturing inaccuracies which give rise to such effects as pyramidal error and axis wobble. These effects give rise to the scanned line being not straight and, more significantly, being unpredictable. Optical corrections are to some extent available but render the resulting scanner very expensive.

In order to overcome the problems associated with the use of rotary polygon mirrors, it has been proposed to effect the desired scanning in the direction perpendicular to the scan lines by moving the image plane itself, such as is done, for example, in both of the above-mentioned prior art references. According to this approach, sequential lines of image data are scanned in the image plane, by transporting the image plane itself in a direction perpendicular to that of the scan lines.

In a practical laser plotter, for example, employing optical scanners of the type described, the resolution of the plotter depends on the number of pixels which can be separately imaged on each scan line and on the optical resolution between adjacent scan lines. Thus, in order to achieve high resolution, more pixels must be imaged on the image plane and, in order to achieve a given data throughput the resulting scanning time is decreased accordingly.

Various proposals have been made in order to increase the resolution along a single scan line by employing multi-spot modulators which, in effect, generate a multi-spot image of a data pattern permitting a plurality of bits to be recorded simultaneously. Such a system is shown, for example, in U.S. Pat. No. 4,577,932 (Gelbart) which discloses a multi-spot light modulator using a laser diode in which a single light pulse from the laser diode generates a multi-spot image of a data pattern, each spot corresponding to an active bit of the data pattern.

However, since prior art systems effect scanning in the direction perpendicular to the scan lines by mechanically transporting the image plane (e.g. photographic film), increasing the throughput in this direction also requires that the image plane be transported mechanically at a faster rate. In practice, it is generally dictated that high resolution laser scanners are used in conjunction with drum plotters rather than flat-bed plotters, since it is mechanically simpler to rotate a drum at high speed than to move a flat-bed plotter to and fro at high speed. However, it will be understood that regardless of whether drum or flat-bed plotters are employed, as soon as scanning normal to the scan line is determined by mechanical considerations, the optical scanning in the normal direction is necessarily limited with respect to that in the scan-line direction.

In addition, there is associated with the use of multi-spot and polygon scanners an optical distortion, since only a single beam can scan along a straight line. The peripheral spots suffer from a bowed scan line. This distortion is inherent to the $f$-$\theta$ lens employed in such scanners and can be cured by resorting to an $f$-$\sin \theta$ lens. This, however, is at the price of increased complexity and expense and furthermore suffers from non-linearity in the scan direction.

SUMMARY OF THE INVENTION

It is an object of the invention to provide a high resolution optical scanner in which the drawbacks associated with hitherto proposed systems are substantially reduced or eliminated.

According to one embodiment of the invention there is provided a high resolution two-directional optical scanner, comprising:

a source of very high frequency light pulses, a first acousto-optic cell for diffracting said light pulses towards an image plane so as to form on a predetermined area thereof a line of pixels corresponding to said data, a second acousto-optic cell intermediate the first acousto-optic cell and the image plane for intercepting the light pulses diffracted by the first acousto-optic cell and diffracting them towards the image plane in a second direction perpendicular to the line of pixels at an angle dependent on a scanning signal fed to the second acousto-optic cell, first optics intermediate the first and second acousto-optic cells for focusing the light pulses diffracted by the first acousto-optic cell onto the second acousto-optic cell, and second optics intermediate the second acousto-optic cell and the image plane for focusing the light pulses diffracted by the second acousto-optic cell onto the image plane.

In such an embodiment, the first acousto-optic cell is a Bragg cell whilst the second acousto-optic cell is an acousto-optic deflector. Thus, in an optical scanner according to the invention, scanning in the direction normal to the scan line is achieved by an additional acousto-optic deflector which diffracts the laser light therethrough in a direction normal to the scan line. In such manner, the image plane may be scanned in two mutually perpendicular directions over a limited area without the need to transport the image plane itself. If a greater area of the image plane must be scanned, then the optical scanner according to the invention may be employed in combination with appropriate movement of the image plane. Since fewer such movements are now required, this results in much improved performance.

The source of very high frequency light pulses may either be a laser diode with associated electronic pulse circuitry or, alternatively, a gas laser, for example, whose light is strobed using an acousto-optic cell functioning as a very high frequency shutter.

In use, each line along the image plane may be scanned by generating a line data pattern within the Bragg cell in accordance with data representative of all the pixels along the scan line and then illuminating the Bragg cell with a high frequency light pulse so that the line data pattern is deflected towards the image plane, thereby illuminating all the pixels in the scan line simultaneously.

Alternatively, a binary data signal may be fed to the first acousto-optic cell representative of successive pixels along the scan line so as to generate a travelling pixel within the first acousto-optic cell which is successively illuminated with high frequency light pulses in accordance with the image data so that the travelling pixel is deflected towards the image plane along the scan line.

In either case, scanning in the direction normal to the scan line is achieved by adjusting the scanning signal fed to the second acousto-optic modulator so as sequentially to vary the diffraction therethrough for each successive scan line.

The scanning signal is periodic, its frequencytime variation typically having a saw-tooth shape which returns to its initial frequency at the end of each complete scan cycle. Clearly, the speed with which this can be achieved depends only on the slew rate of the scanning signal and is very much faster than can be achieved with mechanical systems.

In an alternative embodiment according to the invention, the first acousto-optic cell also functions as an acousto-optic deflector, albeit in a slightly different manner to the operation of the second acousto-optic cell. Thus, on the one hand, it scans in a direction perpendicular to the scan direction of the second acousto-optic deflector. Additionally, it scans only a small number of pixels (e.g. eight) so that it can scan all of its pixels during the time that the second acousto-optic deflector scans a single pixel.

In yet a further embodiment of the invention, there is fed to the first acousto-optic cell a plurality of carrier frequencies each modulated individually in accordance with respective pixel data. By the law of Bragg diffraction, each modulated frequency diffracts the incoming laser beam through a matched Bragg angle, thereby producing a plurality of beams perpendicular to the second acousto-optic deflector. If the number of such beams is kept low, the cross talk between the different carrier frequencies can be tolerated.

BRIEF DESCRIPTION OF THE DRAWINGS

For a clearer understanding of the invention and to see how the same may be carried out in practice, some preferred embodiments will now be described, by way of non-limiting example only, with reference to the accompanying drawings, in which.

DETAILED DESCRIPTION OF THE PREFERRED EMBODIMENTS

Figure 1:
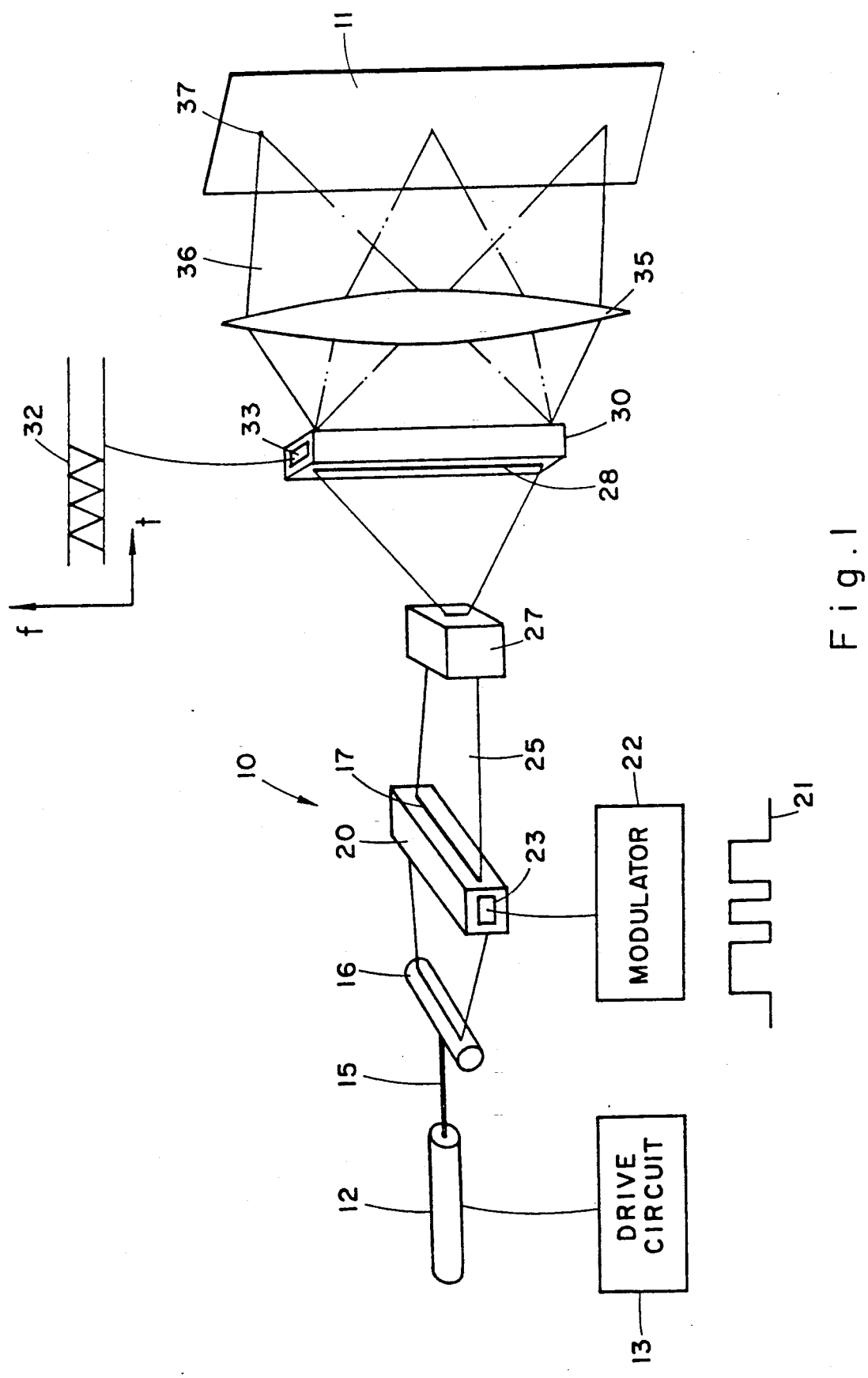
FIG. 1 shows a schematic representation of an optical scanner according to a first embodiment of the invention.

Referring to FIG. 1 there is shown schematically an optical scanner depicted generally as 10 for scanning an image on an image plane 11. The optical scanner 10 comprises a source of laser light 12 coupled to a drive circuit 13 for producing very high frequency pulses of laser light 15. An optical shaper depicted by a cylindrical lens 16 shapes the laser beam 15 into a narrow line 17 which illuminates a Bragg cell 20 (constituting a first acousto-optic cell).

An electrical data signal 21 corresponding to pixel data which is to be imaged on the image plane 11 is amplitude-modulated by a modulator 22 so as to produce an electrical signal which is applied to a piezoelectric crystal 23 at the end of the Bragg cell 20. The piezo-electric crystal 23 vibrates so as to generate an acoustic wave which travels through the length of the Bragg cell 20 and forms therein a variable diffraction grating whose variable width is a function of the presence or absence of data.

Consequently, the output from the Bragg cell 20 is a series of diffracted beams depicted as 25 which emanate from different positions each corresponding to pixel data in the Bragg cell 20. Each beam 25 is shaped and focused by an imaging optics depicted generally as 27 as a focused line image 28 incident on an acousto-optic deflector AOD 30 (constituting a second acousto-optic cell) orientated parallel to the image plane 11 and perpendicular to the orientation of the Bragg cell 20. Thus, whilst each line image 28 is collinear on the AOD 30, each corresponds to a respective pixel in the Bragg cell 20 and thus emanates from a different angle.

A scanning signal 32 whose frequency varies with time according to a saw-tooth relationship is applied to a piezo-electric crystal 33 mounted at an end of the AOD 30 so as to produce therein a variable diffraction grating which diffracts each line image 28 towards the image plane 11 in a direction perpendicular to the beams 25. A lens 35 disposed between the AOD 30 and the image plane 11 focuses each line image 28 exiting from the AOD 30 as a corresponding output beam 36, so as to form a respective point image 37 on the image plane 11. Each focused point image 37 corresponds to a different pixel scanned by the Bragg cell 20. Thus, as the Bragg cell 20 is illuminated with successive pulses of laser light, the frequency of the scanning signal varies so as to diffract successive lines of pixels in the Bragg cell 20 on to successive positions on the image plane 11.

In such a system, the period of the variable frequency scanning signal 32 is such that in one complete cycle, during which the frequency of the scanning signal climbs from its minimum to its maximum value, all lines within a predetermined area of the frame may be scanned, the output beams 36 being returned to the first scan line in the area at the start of each cycle of the scanning signal 32. In the event that the predetermined area is smaller than the area of the image plane 11 which requires scanning, then the image plane 11 is moved along both its axes, so that an adjacent area of the image can be scanned during a subsequent cycle. In practice, some overlap between adjacent scanned areas is introduced in order to avoid loss of data between successive scans.

Ideally, the frequency of the scanning signal 32 falls from its maximum to its minimum value instantaneously. In practice, of course, the slew-rate of the scanning signal 32 is not infinite and consequently some time is lost at the end of each scan cycle during which the scanning signal 32 returns the scanning beam 35 to the start of the scanned area. It will, of course, be appreciated that the lost time is very much shorter than that which could be achieved using only mechanical scanning or transport systems.

Figure 2:
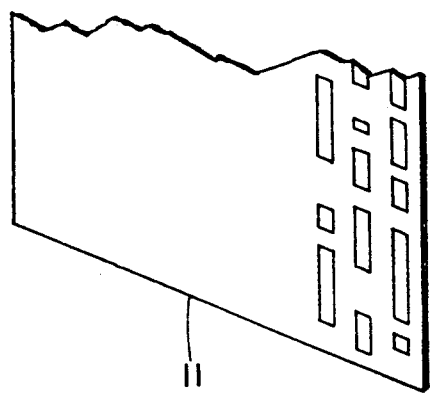
FIG. 2 shows a detail of an image plane for explaining the scanning sequence of the system shown in FIG. 1.

Referring now to FIG. 2 of the drawings, there is shown schematically a sequence for imaging pixels 40 on the image plane 11. Thus, the right-most vertical column of pixels 40 is scanned first, after which the next vertical column of pixels is scanned and so on until all vertical columns of pixels have been thus scanned upon which the scanning signal 32 returns to its initial value and the whole cycle is repeated for the next frame of pixel data.

Figure 3:
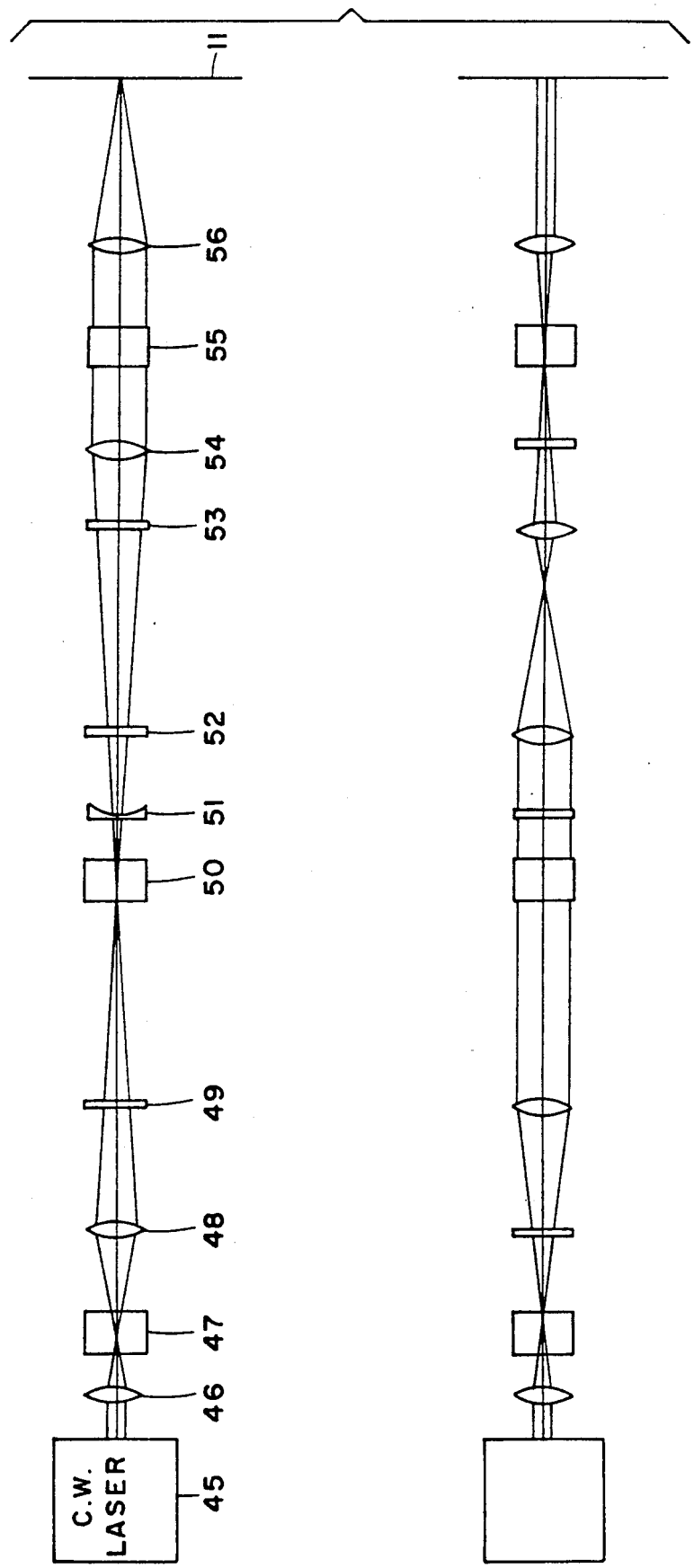
FIG. 3 shows schematically an optical system according to a preferred embodiment of the invention.

Referring now to FIG. 3 of the drawings there are shown scan-axis (top) and imaging-axis (bottom) views of an optical scanner according to one preferred embodiment of the invention. A CW (continuous-wave) laser 45 produces a beam of laser light which is focused by lens 46 into an acousto-optic cell 47 functioning as a high speed acousto-optic modulator AOM for producing very high frequency short pulses of laser light. The output from the AOM 47 is shaped by cylindrical lenses 48 and 49, orientated mutually perpendicularly to each other, so as to form a line image on an acousto-optic cell 50 functioning as a Bragg cell.

The beam is thus diffracted by the Bragg cell 50 in accordance with data fed thereto as explained in detail above with reference to FIG. 1 of the drawings. The diffracted beam exiting from the Bragg cell 50 is shaped in a plane normal to the imaging plane 11 by means of a planoconvex lens 51, a pair of cylindrical lenses 52 and 53 and a convex lens 54 so as to form, in combination, a line image which is applied to a third acousto-optic cell 55, functioning as an acousto-optic deflector, AOD. The AOD 55 thus diffracts the beam fed thereto in a direction perpendicular to that produced by the Bragg cell 50, the resulting diffracted beam being focused by a convex lens 56 on to the image plane 11.

In such a system, the Bragg cell 50 and the AOD 55 correspond, respectively, to the first and second acousto-optic cells described above with reference to FIG. 1 of the drawings. The AOM 47 (constituting a third acousto-optic cell) functions as a high speed shutter which ensures that the resulting pulse frequency of the pulsed laser light is sufficiently high. If desired, a laser diode may be employed as the source of laser light, in which case a suitable high-speed electrical pulse circuit may be used and the AOM 47 dispensed with.

In use, data may be fed to the Bragg cell (20,50) in one of two ways. According to a first method, a complete line data pattern is generated within the Bragg cell (20,50) in accordance with data representative of a first line of pixels and the Bragg cell (20,50) is then illuminated with a single burst of laser light so that the line data pattern is deflected towards the image plane along a first line thereon. This sequence is repeated for successive lines of pixel data, the time taken to fill the Bragg cell (20,50) with the data pattern corresponding to the pulse frequency of the laser light. During the small time interval between successive pulses, the frequency of the scanning signal applied to the acousto-optic deflector AOD (30,55) increases slightly so that the resulting diffraction grating generated within the AOD (30,55) is more dense, thereby diffracting the input beam through a greater angle.

According to a second mode of modulation, each pixel data is fed to the acousto-optic modulator AOM (47). A pulse of acoustic power is then applied to the Bragg cell (20,50) which deflects the laser beam modulated by the AOM (47) to a corresponding location on the image plane 11 in accordance with the pixel data.

The process of scanning along a given line of pixels in the image plane 11 is repeated for each successive line, in turn, and the successive scanning of adjacent lines of pixels is achieved exactly in the manner described above, by varying the frequency of the scanning signal applied to the AOD (30,55). Since the frequency of the scanning signal increases slightly between successive pixels being imaged on to the image plane 11, the resulting pixels are not imaged exactly along the desired scan line. However, the off-axis discrepancy is a function of the frequency of the scanning signal and of the frequency of the laser 45 and is therefore predictable. It may therefore be compensated for either optically or by distorting the image plane 11.

When used in a high resolution scanner having a large image area, the invention may be employed to scan a limited area of the image. This having been done, it is then necessary to move the image plane mechanically, so that resulting scan cycles image adjacent areas of the image plane. In practice, in order to ensure against data loss, the image plane is moved in mutually perpendicular directions by an amount slightly less than the corresponding axial dimensions of the scanned area, so that successive scan areas overlap slightly.

Typically, the lens 35 (FIG. 1) is an $f\text{-}\theta$ or an $f\text{-}\tan\theta$ optics which produces optical distortions in the resulting pixels imaged on the image plane 11. Distortion in the slow scan direction of the AOD (30, 35) caused by non-linearity of the scan optics can be corrected in the following manner. First, the non-linearities are measured and the data is then fed to the Bragg cell (20, 50) whilst adjusting the pulse applied to the AOM 47 so as to compensate for the measured non-linearities. Alternatively, the rate at which the frequency of the scanning signal applied to the AOD (30, 55) is changed may be rendered non-linear in a sense opposite to the measured optical non-linearity so as to compensate completely for the measured distortion.

Figure 4:
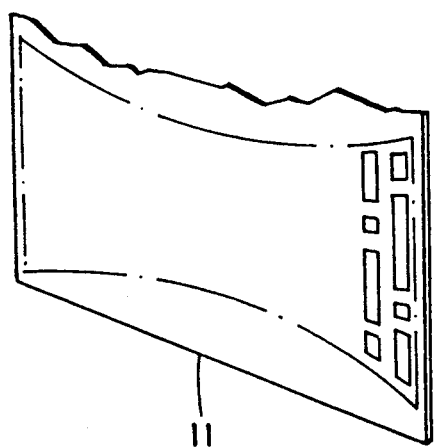
FIG. 4 is a detail of an image plane showing optical distortion produced by the scanning optics in the system shown in FIG. 1.

FIG. 4 shows the effect of pin cushion distortion on the resulting pixel distribution on the image plane. It is seen that the vertical lines along the horizontal scan directions have different lengths depending on their position along the scan. These distortions can be corrected by measuring them first and then manipulating the sequence of data fed to the Bragg cell (20, 50) so as to compensate for the measured distortions. This is easily achieved by adding or substracting clock pulses to the scanning signal or by introducing a variable delay thereto.

Figure 5:
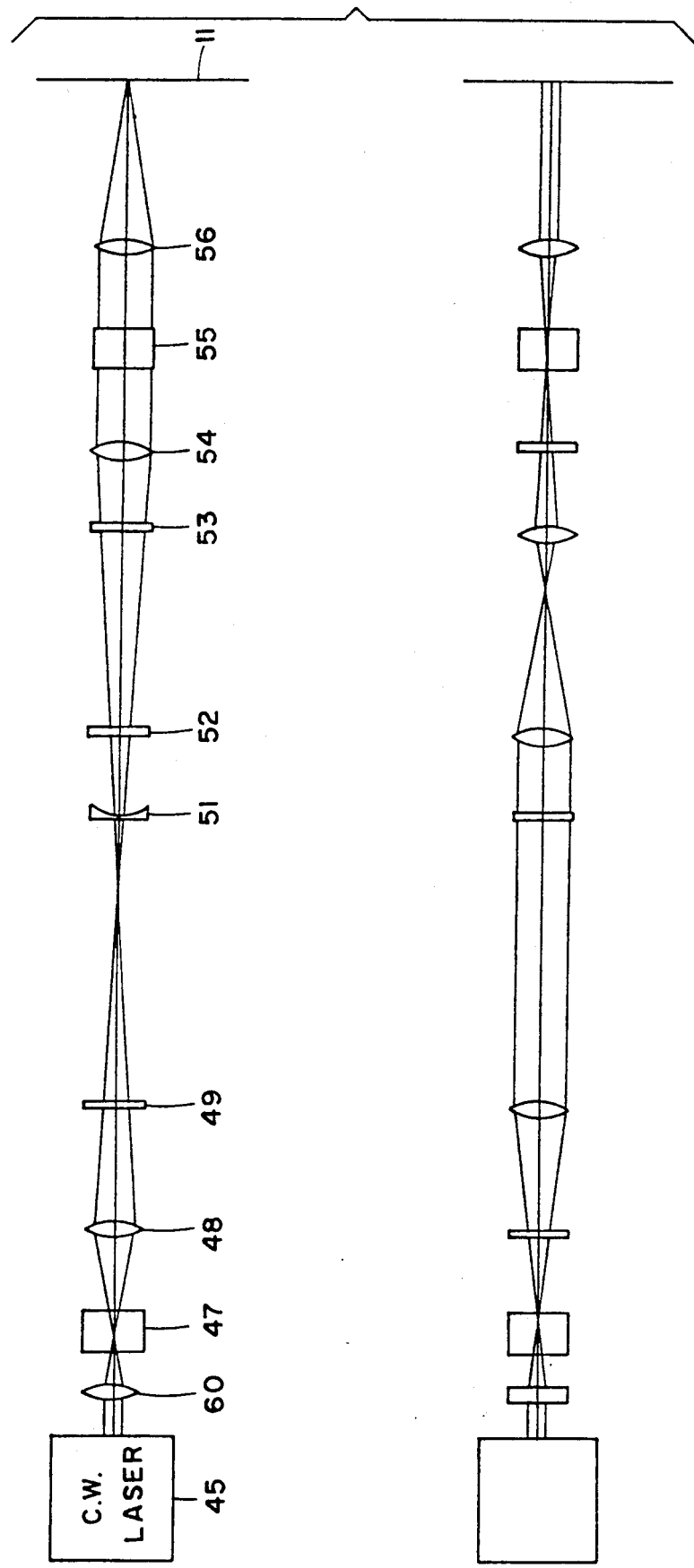
FIG. 5 shows a schematic representation of an optical scanner according to a second embodiment of the invention.

FIG. 5 shows a second embodiment according to the invention for scanning an image on image plane 11. To the extent that the same components appear in FIG. 5 as have already been described with reference to FIG. 3 of the drawings, identical reference numerals will be employed.

Thus, shown in FIG. 5 is a CW laser 45 which produces a beam of light which is focused by a cylindrical lens 60 into a first acousto-optic cell 47 which diffracts the laser beam in a plurality of different angles each corresponding to a respective pixel to be imaged on the image plane.

According to a first mode of modulation, the data is fed sequentially to the acousto-optic cell 47 whilst, at the same time, chirping the carrier acoustic frequency of the acousto-optic cell 47 in synchronism with the data. The cylindrical lens 49 converts the angular tilt of the incoming beam to a corresponding positional location at its focal plane. Lenses 52, 53 and 56 image the focal plane of the cylindrical lens 49 on to the image plane 11. In effect, the first acousto-optic cell 47 behaves both as an AOD and as an AOM simultaneously. During the small time interval that each angular sweep is completed, the frequency of the second acousto-optic cell 55, which functions as an AOD, is increased slightly in a manner similar to that described above with reference to FIG. 3 of the drawings.

According to a second mode of modulation, the pixel data is fed simultaneously to the acousto-optic cell 47, each pixel having a different frequency carrier signal. This, in effect, generates a plurality of diffraction gratings within the acousto-optic cell 47 superimposed one on top of the other, causing the incoming light beam to be diffracted through a different Bragg angle each in respect of a corresponding pixel. Subsequent operation of the system is exactly the same as the first mode of modulation described above.

Optical distortion can be corrected in the second embodiment in a manner similar to that employed in the first embodiment described in detail above with reference to FIG. 3 of the drawings. In particular, the pin cushion distortion shown pictorially in FIG. 4 of the drawings can be measured as a function of line position and then compensated for by slightly changing the carrier frequency of each pixel in synchronism with the measured distortion, thereby nullifying the distortion.

We claim:

1. A high resolution two-directional optical scanner for imaging pixel data onto an image plane, the optical scanner comprising:
    a source of light,
    a first acousto-optic cell for receiving an acoustic signal modulated in accordance with a line of said pixel data so as to form therein a diffraction grating corresponding to the line of pixel data and which diffracts said light towards an image plane so as to form simultaneously on a predetermined area thereof a line of pixels corresponding to said line of pixel data,
    a second acousto-optic cell intermediate the first acousto-optic cell and the image plane for intercepting the light diffracted by the first acousto-optic cell and diffracting it towards the image plane in a second direction perpendicular to the line of pixels at an angle dependent on an instantaneous frequency magnitude of a variable frequency scanning signal fed to the second acousto-optic cell,
    first optics intermediate the first and second acousto-optic cells for focusing the light diffracted by the first acousto-optic cell onto the second acousto-optic cell, and
    second optics intermediate the second acousto-optic cell and the image plane for focusing the light diffracted by the second acousto-optic cell onto the image plane.

2. The optical scanner according to claim 1, further including:
    mechanical transport means coupled to the image plane for transporting the image plane in at least one of two mutually perpendicular directions in the image plane after said predetermined area has been scanned;
    thereby permitting an area of the image plane larger than said predetermined area to be scanned.

3. The optical scanner according to claim 1, wherein the frequency of the scanning signal is adjusted in accordance with measured distortions in the second optics so as to compensate for said distortions.

4. In the optical scanner according to claim 1, a method for illuminating successive lines of pixels on the image plane, comprising the steps of:
    (1) simultaneously feeding a plurality of different frequency data signals to the first acousto-optic cell representative of a like plurality of successive pixels in a first line of pixels so as to generate within the first acousto-optic cell a different diffraction grating in respect of each one of said pixels,
    (2) illuminating the first acousto-optic cell with a continuous light source so that it is diffracted by each of the diffraction gratings towards the image plane along the first line of pixels,
    (3) adjusting the scanning signal applied to the second acousto-optic cell so that the first line of pixels is diffracted thereby onto the image plane along a line proximate a previous line of pixels, and
    (4) repeating steps (1), (2) and (3), as required, for successive lines of pixels.

5. The method according to claim 4, further including the steps of:
    (5) measuring a distortion on the image plane as a function of line position, and
    (6) compensating electronically for said measured distortion by effecting a corresponding counter-distortion to the frequency of each of the data signals so as to nullify the net measured distortion on the image plane.

6. In the optical scanner according to claim 1, a method for illuminating successive lines of pixels on the image plane, comprising the steps of:
  (1) sequentially feeding to the first acousto-optic cell a data signal whose frequency is chirped in synchronism with successive pixels in a first line of pixels so as to generate within the first acousto-optic cell a different diffraction grating in respect of each one of said pixels,
  (2) illuminating the first acousto-optic cell with a light pulse so that it is diffracted by each of the diffraction gratings towards the image plane along the first line of pixels,
  (3) adjusting the scanning signal applied to the second acousto-optic cell so that the first line of pixels is diffracted thereby onto the image plane along a line proximate a previous line of pixels, and
  (4) repeating steps (1), (2) and (3), as required, for successive lines of pixels.

7. The method according to claim 6, further including the steps of:
  (5) measuring a distortion on the image plane as a function of line position, and
  (6) compensating electronically for said measured distortion by effecting a corresponding counter-distortion to the frequency of each of the data signals so as to nullify the net measured distortion on the image plane.

8. The optical scanner according to claim 1, wherein the source of light produces pulses of light having a predetermined pulse frequency.

9. The optical scanner according to claim 8, wherein the source of light pulses comprises:
  a laser for producing a laser beam, and
  a third acousto-optic cell operating as a shutter having a predetermined frequency for intercepting the laser beam and transmitting it therethrough at the shutter frequency.

10. The optical scanner according to claim 8, wherein the source of light pulses comprises:
  a source of continuous laser light, and
  a pulse circuit coupled to the source of continuous laser light for producing bursts of laser light having a predetermined pulse frequency.

11. In the optical scanner according to claim 8, a method for illuminating successive lines of pixels on the image plane, comprising the steps of:
  (1) generating a line data pattern within the first acousto-optic cell in accordance with data representative of a first line of pixels,
  (2) illuminating the first acousto-optic cell with one of said light pulses so that the line data pattern is deflected towards the image plane along the first line of pixels,
  (3) adjusting the scanning signal applied to the second acousto-optic cell so that said first line of pixels is diffracted thereby onto the image plane along a line proximate a previous line of pixels, and
  (4) repeating steps 91), (2) and (3), as required, for successive lines of pixels.

12. The method according to claim 11 further including the step of compensating for any non-collinearity on the image plane of the pixels in said successive lines of pixels.

* * * * *